United States Patent [19]
Pećar

[11] 3,987,629
[45] Oct. 26, 1976

[54] SYSTEM FOR PRODUCING WORK USING A SMALL TEMPERATURE DIFFERENTIAL

[76] Inventor: Milan Pećar, Ante Kovacica 1, Zagreb, Yugoslavia

[22] Filed: June 17, 1975

[21] Appl. No.: 587,704

Related U.S. Application Data

[63] Continuation-in-part of Ser. No. 480,096, June 17, 1974, Pat. No. 3,932,995, which is a continuation-in-part of Ser. No. 241,596, April 6, 1972, abandoned.

[52] U.S. Cl. ................................. 60/516; 60/721
[51] Int. Cl.² ........................................ F03G 7/04
[58] Field of Search ............ 91/4; 60/516, 670, 721

[56] References Cited
UNITED STATES PATENTS

| | | | |
|---|---|---|---|
| 3,608,311 | 9/1971 | Roesel, Jr. | 60/516 |
| 3,830,065 | 8/1974 | McAlister | 60/670 |

Primary Examiner—Allen M. Ostrager
Attorney, Agent, or Firm—Karl F. Ross; Herbert Dubno

[57] ABSTRACT

The small temperature differential between a warmer zone and a colder zone is exploited to produce work by confining a liquid having a temperature between the temperatures of the warmer and colder zones within a substantially closed air-free chamber in the warmer zone so as to vaporize part of the liquid and drive the remainder by its own vapor pressure to perform work by conversions of the potential or kinetic energy of the liquid. The liquid can pass over and drive a turbine for example. The liquid then flows into another chamber closed to the atmosphere. Once the liquid has been transferred from the first to the second chamber, the chambers may be functionally interchanged or the liquid again transferred to the first chamber.

14 Claims, 4 Drawing Figures

ID
SYSTEM FOR PRODUCING WORK USING A SMALL TEMPERATURE DIFFERENTIAL

CROSS-REFERENCE TO RELATED APPLICATION

This application is a continuation-in-part of my Application Ser. No. 480,096 filed June 17, 1974 (now U.S. Pat. No. 3,932,995 issued Jan. 20, 1976), the latter application being in turn a continuation-in-part of then pending application Ser. No. 241,596 filed Apr. 6, 1972, now abandoned.

FIELD OF THE INVENTION

The present invention relates to a method of and an apparatus for producing work using a temperature differential. More particularly this invention concerns the exploitation of a small temperature differential such as occurs in nature for the development of energy.

BACKGROUND OF THE INVENTION

It is known to use liquid ammonia to produce work. The liquid ammonia is evaporated at the bottom of a large closed system such that the vapors flow up to the upper, cool end of this system where they are condensed. This condensate flows down to the hot bottom of the system through a turbine or other such device which serves, water-mill fashion, to produce work from the falling liquid. Such a system requires a temperature differential of at least 20°C in order to function and must be relatively large.

It is also known to evaporate a hydrocarbon, such as propane, having a low boiling point by means of warm surface sea water. The vapor propels a turbine and is condensed by cooler sea water drawn up from well below the surface, whereupon the condensate is again evaporated. Such an arrangement is frequently relatively bulky and requires considerable investments in equipment, along with a particular geographic location. Such power generation requires the turbine or the like to be moved directly by vapor and not by liquid. The condensed propane is pumped from the condenser to the vaporizer so the whole device is extremely large and very expensive.

The exploitation of geothermal energy also presents another potential source of power. This is done by simply driving a turbine with steam issuing from a steam well or the like, or by using the heat at several hundred meters below the surface to boil water. The generated steam is used to drive turbines. Since water has a relatively high evaporation entropy and a correspondingly low vapor pressure it is necessary to drive the turbine with the liquid. Since it is necessary to drill an extremely deep well to obtain a temperature of between 90° and 130° C the cost of such an installation is usually prohibitive.

OBJECTS OF THE INVENTION

It is therefore an object of the present invention to provide an improved method of and apparatus for producing work using a temperature differential.

Another object of this invention is to provide an improved system for exploiting a relatively small temperature differential so as to develop energy.

SUMMARY OF THE INVENTION

These objects are attained according to the present invention in a system where a substantially closed air-free chamber is provided in a zone having a temperature higher than the boiling point of a body of highly volatile liquid in the chamber. A tube extends from the bottom of this chamber to the upper end of an air-free duct situated in a colder zone.

A turbine, by which is meant any device which transforms a liquid flow to a usable form of work, is provided in the duct and the lower end of the duct is connected to another closed chamber so that the liquid flowing down the duct turns the turbine and is collected in the other chamber.

The vapor pressure in the first-mentioned chamber forces the liquid up the tube so that it drops down the duct and operates the turbine. When all of the liquid has flowed out of the first-mentioned chamber and conduits between the lower and upper end of the turbine duct and the second chamber are closed and the conduits between the first chamber and the upper and lower end of the duct are opened.

Thereupon the second chamber acts just as the first, with the vapor pressure developed therein forcing the liquid up a respective second tube so as to operate the tubine. The liquid flows down the duct and into the first chamber. At the same time the liquid flowing into the chamber whose upper vapor conduit is open tends to vaporize again through this vapor conduit and into the upper end of the duct whereupon it condenses and descends in the duct, also operating the turbine. The two chambers, the duct, the two vapor conduits and the four fluid conduits all form a closed air-free system so that no fluid is lost.

A model made in the laboratory of such an arrangement with a pair of similar 1-liter flasks using 450 milliliters of liquid was so sensitive to small temperature differentials that merely applying a finger to the closed chamber was sufficient to pump this liquid from this chamber into the other.

According to yet another feature of this invention the entire closed system is evacuated so that only the working fluid and its vapor is left in it. In this manner minimum pressure gives a maximum relative pressure differential between the two chambers. In addition the volume evaporation work in the closed chamber is transmitted to the liquid without loss and this work is simultaneously increased by the negative volume work of condensation also without any losses.

Another advantage of this system over the type using chambers having pistons or bellows allowing variation in volume is that in the present type of system the liquid acts itself as a piston which gives a perfect seal at all times and can adapt to any shape. In addition the friction effective on a liquid is so very low as to be virtually negligible and does not cause any wear so that the volume work is directly transmitted to the turbine without any intermediary.

Thus in accordance with the present invention a pair of such thermoexchanging chambers are used alternately as vaporizer and condenser. In this manner the maximum temperature differential between the propelling liquid and the thermopoles is obtained so that maximum transformation of heat into work is achieved. In such a system the two chambers constitute the greater bulk of the apparatus so that a relatively great amount of work can be produced in a relatively limited space.

The fluid according to the present invention may have a pair of phases, a rapidly volatile actively propelling liquid and another nonvolatile inert liquid. A small quantity of the active working fluid drives a large quantity of the inert one. It is also possible in accordance with this invention to pressurize the entire closed system so as to obtain maximum lift.

The turbine in accordance with this invention is rotated by a liquid, not by a vapor, so that a maximum amount of kinetic energy is exploited. The fluid driving the turbine is only slightly condensed while for the most part the working fluid neither evaporates nor condenses.

In view of the completely contained system the chance of pollution or other deleterious environmental effect is almost completely eliminated.

The invention in addition can be used for the distillation and drying of many substances, especially unstable ones, and can be used as a small energy generator usable for instance on a space vehicle or the like. In addition the apparatus according to the present invention provides a particularly vivid representation of the Carnot cycle. Since the system is completely closed it needs no recharging and, since the working and propelling fluids can be completely inoffensive and noncombustible the apparatus is safe and neat.

In the apparatus according to the present invention the pressure head over the fluid in the closed vessel is created by the temperature in the warmer zone by heating and vaporizing the liquid. This head forces the liquid up the drive tube or pipette so that it can cascade freely down in the duct, falling on and operating the turbine to produce mechanical work. Since the duct is in the cooler zone the vapor pressure in this duct will be lower than that in the closed vessle or chamber, and any vapor rising in the vapor conduit out of the other chamber, which is open, will be condensed and serve also to operate the turbine.

It is important to the present invention that the device be hermetically sealed against the atmosphere so that the only fluids contained therein are the working fluid or fluids in liquid or vapor form.

Essentially the invention uses the principle that a pressure differential can be created between a relatively warm chamber and a relatively cool chamber by evaporating a liquid in the relatively warm chamber and driving this liquid by the pressure of its vapor or the pressure of some other vaporized fluid into the relatively cool chamber. The body of displaced liquid performs mechanical work according to the invention and in this respect the system differs from prior-art concepts which utilize a transformation of state to perform work, the actual work being a result of expansion of a fluid. In the present concept, the expansion of a fluid displaces a body of the same fluid in a liquid state, which moving liquid hydrodynamically produces work.

The system can be embodied in a laboratory model in which the liquid is driven upwardly into a column from which it descends in free fall to drive the turbine, or in a system for practical generation of electricity in which heat exchangers within the chambers dip into a readily volatizable fluid overlying a highly specific gravity working fluid.

BRIEF DESCRIPTION OF THE DRAWING

The above and other objects, features and advantages of the invention will become more readily apparent from the following description, reference being made to the accompanying drawing in which.

SPECIFIC DESCCRIPTION

Figures 1, 2:
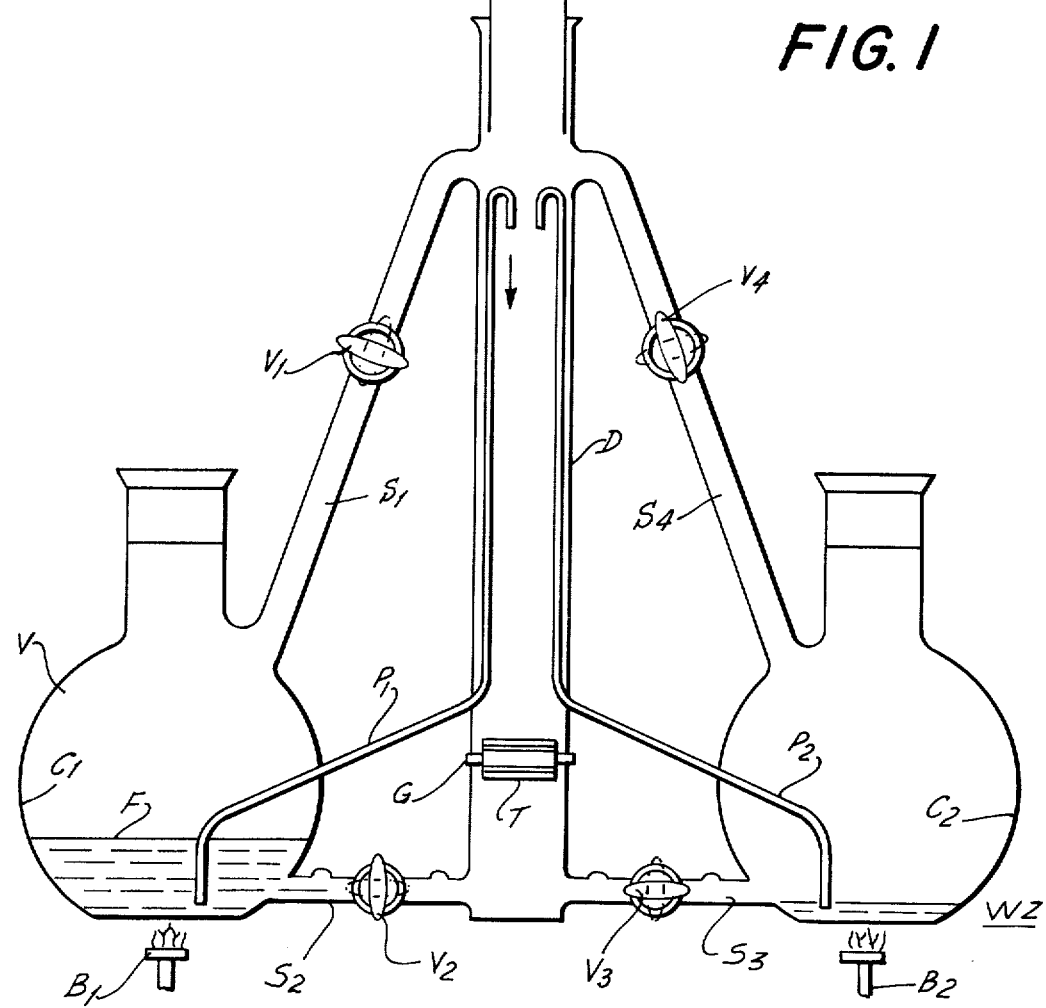
FIG. 1 is a side-elevational view of the system according to the present invention.
FIG. 2 is a detail view of an alternative valve arrangement for the system according to this invention.

As shown in FIG. 1 a pair of closed chambers $C_1$ and $C_2$, here each formed by a plugged glass retort, are both located in a warm zone WZ here created with the help of a apir of small burners $B_1$ and $B_2$. A duct D situated between the two chambers $C_1$ and $C_2$ opens in a cooler zone CZ created by a cooler K operating with a reflux coil R in the duct D. The upper region of each of the chambers $C_1$ and $C_2$ is connected, via a relatively large diameter conduit $S_1$ and $S_4$, to the upper end of the duct D. Respective valves $V_1$ and $V_4$ are provided in the conduits $S_1$ and $S_4$ and can be operated to permit vapor flow through these conduits.

A further pair of large-diameter conduits $S_2$ and $S_3$ extend between the lower regions of the chambers $C_1$ and $C_2$ and the lower end of the upright duct D. Respective valves $V_2$ and $V_3$ are provided in these conduits $S_2$ and $S_3$ and can be operated to permit fluid flow through these conduits.

Small-diameter tubes or pipettes $P_1$ and $P_2$ have their lower ends situated at the very bottom of the respective chambers $C_1$ and $C_2$ and their upper ends located at the upper end of the duct D. A small turbine T connected to a generator G is provided adjacent the lower end of duct D.

The system formed by the two chambers $C_1$ and $C_2$, the four conduits $S_{1-4}$, the two tubes $P_1$ and $P_2$, and the duct D, is air-evacuated and completely closed and operates as follows:

To start with the valves $V_2$ and $V_1$ are closed and the valves $V_4$ and $V_3$ are opened. The chamber $C_1$ has been preliminarily filled with a fluid F having a vapor head V and a surface lying above the bottom end of the pipette $P_1$. The warm zone WZ causes the vapor pressure above the fluid F to increase, thereby forcing this fluid F up the pipette $P_1$ whence it drips down in the cooler duct D over the turbine T. This action rotates the turbine and causes the generator G to make electricity. The liquid or condensate so falling then runs through the conduit $S_3$ into the chamber $C_2$. Since the conduit $S_4$ is open it is possible for the fluid level to rise in this chamber $C_2$ well above the conduit $S_3$.

Once the surface level of the fluid F is below the lower end of the pipette $P_1$ the valves $V_{1-4}$ are all reversed into their dot-dash positions. This closes off the conduits $S_3$ and $S_4$ while opening the conduits $S_1$ and $S_2$ so that the process described above now takes place with the fluid F running up the pipette $P_2$ and thence into the chamber $C_1$.

The fluid F used here can be, for instance, acetone and in accordance with the present invention air is excluded from the system. It is also possible according to this invention to create a partial vacuum in the system so as to lower the boiling point of the fluid being used. In all cases the boiling point of the liquid used must lie between the temperatures of the warmer and cooler zones.

FIG. 2 shows how the valves $V_1$ and $V_4$ can be replaced by a single three-way valve $V_5$ which in the illustrated position connects together the conduits $S_1$ and $S_4$. When rotated 90° in one direction from the illustrated position it will close off one of the conduits $S_1 S_4$ and open the other; when rotated in the opposite direction it will have the opposite effect.

It is possible in accordance with the present invention to dispense with either the burners $B_1$ or $B_2$ or the cooler K, or even both alternately one of the burners $B_1$ or $B_2$ and the cooler K or without with both where a natural temperature differential exists between the warm zone WZ and the cold zone CZ.

The apparatus illustrated in FIG. 1 was used with a pair of 1-liter retorts constituting the chambers $C_1$ and $C_2$ and using 450 milliliters of acetone. Any other fluid having under normal conditions a boiling point below 80° C would also be usable. With a temperature differential between the colder zone CZ and the warmer zone WZ of between 3° C and 14° C it is possible to keep the turbine T rotating continuously. The flow starts when the temperature differential between the fluid in the chambers $C_1$ and $C_2$ has attained a value of between 0.5° and 0.7° C. Between 3.8 and 36 minutes were needed to pump the fluid out of the one chamber. In fact the apparatus is so sensitive that at normal room temperature using acetone as the fluid with a system evacuated such that the acetone vaporizes at approximately 68° F, it is possible to set the turbine operating simply by placing a finger on the closed retort.

It is similarly possible in accordance with this invention to use a highly pressurized system by carbon dioxide, ammonia, chlorine or the like as the working fluid. Otherwise the more volatile solvents such as the lower hydrocarbons, the ethers, various esters, ketones and alcohols are indicated. For example if liquid ethane is used with a temperature differential from 15° to 34.5° C it is possible to obtain a pressure of 17.7 atms, equivalent to a lift of water of 183 meters.

Figure 3:
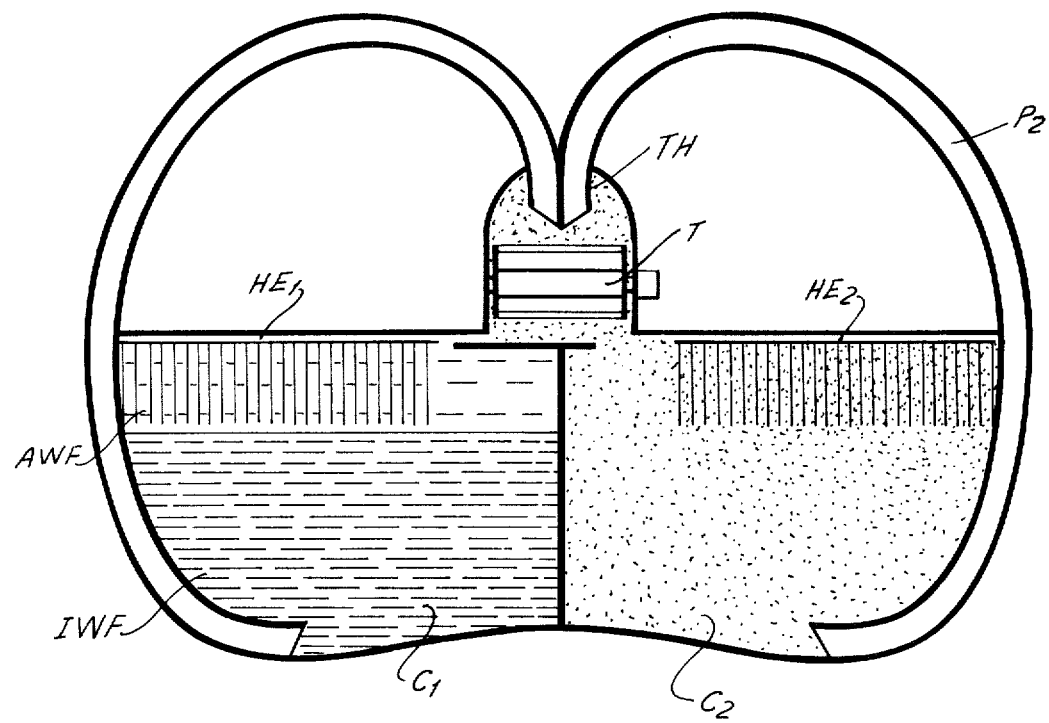
FIG. 3 is a diagrammatic cross-sectional view of an electricity generating system according to the invention.

In FIG. 3 I have shown a system which comprises, in a hermetically sealed unit, closed from the environment and containing liquid and vapors only of the fluids involved, a first and a second chamber $C_1$, $C_2$, each of which is connected in the bottom with a turbine chamber TH via a pipe $P_1$, $P_2$. Thus as a pressure builds up in one of the chambers, the liquid therein will be displaced upwardly through the respective tube $P_1$, $P_2$ to drive the turbine T. The latter is connected to an electric generator by any conventional means.

Two fluids are used in the system of FIG. 3, namely, an active, high volatility fluid AWf and a high specific gravity working fluid IWf, the liquids being nonmiscible. In principle, the high volatility fluid is vaporized and the pressure of its vapor displaces the underlying heavier liquid through the respective pipe $P_1$, $P_2$ to hydrodynamically displace the turbine.

A heat exchanger $HE_1$, $HE_2$ is provided in each chamber and consists of an array of plates through which a heating fluid or a cooling fluid can be circulated, the plates extending downwardly so that they can dip into any upper liquid within the respective chamber.

Figure 4:
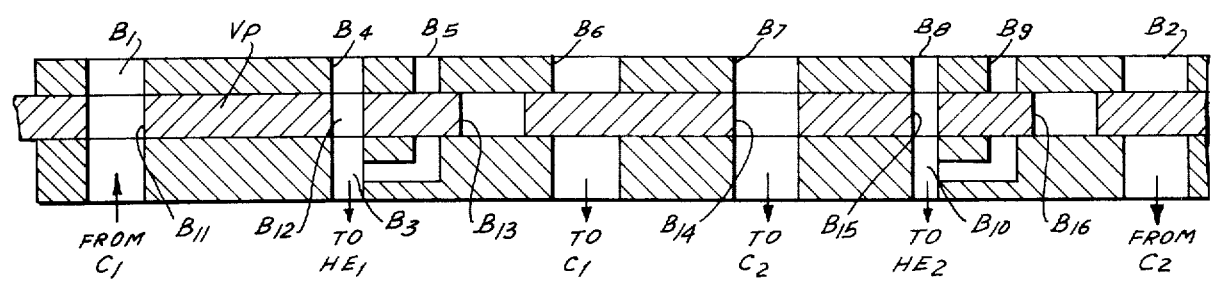
FIG. 4 is a diagram of the valving arrangement for this system.

A valve V, best shown in FIG. 4, is provided within the device and serves to connect a source of heating fluid HC and a source of cool fluid CoC with the heat exchangers. A suitable construction of the valve is also found in this FIG. Thus the valve may have a port $B_1$ between the upper and lower sections of duct $P_1$ and a corresponding port $B_2$ between the upper and lower portions of duct $P_2$. A port $B_3$ communicates with the fluid inlet of the heat exchanger $HE_1$ and may be selectively connected to a port $B_4$ or a port $B_5$ respectively communicating with a heating fluid source HC and the cooling fluid source CoC. Another port $B_6$ connects the turbine chamber TH with the chamber $C_1$. Similarly, port $B_7$ connects the turbine chamber TH with the chamber $C_2$ while ports $B_4$, $B_8$ and $B_9$ are respectively connected to the cooling chamber CoC and the heating source HC for selective connection to the that exchanger $HE_2$ by a port $B_{10}$.

The valve slider has a series of ports $B_{11}$, $B_{12}$, $B_{13}$, $B_{14}$, $B_{15}$, and $B_{16}$ whose functions will be described below.

In the position of the valve plate VP shown in FIG. 4, for example, port $B_1$ is unblocked to permit the flow of liquid from the bottom of chamber $C_1$ to the turbine chamber TH, port $B_4$ is connected by port $B_{12}$ to port $B_3$ to feed heating fluid to heat exchanger $HE_1$. Port $B_7$ is unblocked to permit the liquid to flow from the turbine chamber TH into chamber $C_2$, port BH is connected by port $B_{16}$ to port $B_{10}$ so that cooling fluid is supplied to heat exchanger $HE_2$ and the port $B_2$ is blocked.

When the plate VP is shifted to the right, the port $B_1$ is blocked, port $B_5$ is connected to port $B_3$, port $B_6$ is unblocked, port $B_7$ is blocked, port $B_9$ is connected to port $B_{10}$ and port $B_2$ is unblocked.

In the air-free chamber $C_1$ which is closed towards the turbine housing TH by a sliding valve V, there is a nonvolatile heavy (high specific gravity) inert working fluid IWF on top of which is a light (low specific gravity) easily volatile active working fluid AWF into which dip the plates of a dense thin plate-like heat exchange unit $HE_1$ with a large contact surface.

The air-free evacuated chamber $C_2$ is then opened by the same valve V towards the turbine housing TH and contains only the vapor of the active working fluid AWF and plate-type heat exchange unit $HE_2$.

When a relatively cool body is contacted with or a cool fluid is permitted to enter into the heat exchange unit $HE_2$ and a warm body is brought into contact with or a warm fluid is fed into the heat exchange unit $HE_1$, active working fluid AWF in $C_2$ chamber quickly condenses on heat exchange unit $HE_2$ and sucks the inert working fluid IWF from $C_1$ chamber through pipe $P_1$ over the turbine T into the $C_2$ chamber, while active working fluid AWF in $C_1$ chamber quickly evaporates and drives the inert working fluid IWF mass from $C_1$ chamber through pipe $P_1$ over the turbine T into the $C_2$ chamber.

As soon as $C_1$ chamber is emptied of inert working fluid IWF the automatic sliding valve V, while closing the $C_2$ chamber, opens the $C_1$ chamber. At that moment, the sliding valve V, automatically and simultaneously permits the inflow of cooler fluid into the heat exchange unit $HE_1$ and warmer fluid into the heat exahange unit $HE_2$. Consequently, the active working fluid AWF in $C_1$ chamber quickly condenses on the heat exchange unit $HE_1$ and sucks the liquid IWF from $C_2$ through $P_2$ over turbine T into $C_1$, while active working fluid AWF in $C_2$ chamber evaporates and drives the inert working fluid IWF out of the $C_2$ chamber through pipe $P_2$ over turbine T into the $C_1$ chamber. As soon as the inert working fluid IWF vacates the $C_2$ chamber, the automatic valve V while closing the $C_1$ chamber opens the $C_2$ chamber and simultaneously and automatically permits the cooler body to pass into the heat exchange unit $HE_2$, and the warmer body into the heat exchange unit $HE_1$ in such a manner, as to insure a continuing process of heat conversion into work.

The automatic sliding valve V is directed by a relay switch located at the intake of pipes $P_1$ and $P_2$ in $C_1$ and $C_2$ chambers in such a manner, that the valve V as shown in FIG. 4, not only closes and opens $C_1$ and $C_2$ respectively, but also simultaneously let in and out an alternate flow of warmer fluid from the heat container HC, and cooler fluid from the cooling container CoC into the heat exchange unit $HE_1$ and $HE_2$ respectively.

In order to insure an intensive continuity of such a heat conversion into work, two pairs of chambers $C_1$, $C_2$ can be connected to the same turbine T; while one pair closes the loaded open chamber CO and opens the emptied closed chamber CC, the second pair drives the inert working fluid IWF with great intensity from the CC chamber over the turbine T into the CO chamber.

In order to insure a totally hazardless and pollution-free equipment within human environment, the inert working fluid IWF and active working fluid AWF should be composed of non-explosive and noninflammable material from the inorganic chemical field, so that the inorganic liquids are preferable.

Inert working fluid IWF should give a maximum of power in as small an engine E as possible. Hence, the best choice for that purpose would be Mercury Hg.

In order to obtain a maximum change of pressure through change of temperature $\Delta p/\Delta t$, with a minimum of input and loss of heat, active working fluid AWF should have its critical temperature $t_{krit}$ as close to the environment temperature as possible. Hence, the logical active working fluid AWF choice would be liquid carbon-dioxide $CO_2$ with a critical temperature $t_{krit} = 31.35°$ C and a critical pressure $p_{krit} = 75.3$ atm, and liquid noble gas Xenon Xe with $t_{krit} = 16.6°$ C and $p_{krit} = 58.2$ atm. $CO_2$ and Xe features as basic active working fluids could be improved by adding other liquids and gases.

Mercury Hg is used as the inert working fluid IWF, and that, in a quantity of 1 $m^3$ = 13,560 kg.

Liquid carbon dioxide $CO_2$ is used as active working fluid AWF mainly for economy reasons. As temperature increases so does the $CO_2$ $\Delta p/t$ at an accelerated pace until it reaches 30° C but, therefore decreases its relative evaporation volume $v_D/v_F$ ($v_D$ is specific volume of saturated vapor $m^3 \cdot kg^{-1}$, $v_F$ is specific liquid volume $m^3 \cdot kg^{-1}$) and that, at a retarded pace until it reaches 25° C. Out of maximum acceleration growth of $\Delta p/t$ and the minimum slow-down in decrease of relative evaporation volume condensation temperature of 20° C and evaporation temperature of 25° C have been chosen and can be reached through condenser temperature of 18° C, and evaporator temperature of 27° C. The greater the $\Delta t$ of evaporator and condenser, the better will be heat exchange, the evaporation and condensation will be faster, and power output larger. To temperature $t = 20°$ C corresponds pressure $p = 58.15$ atm, while to $t = 25°$ C corresponds $p = 65.29$ atm. Hence, a temperature differential of $\Delta t = 5°$ C gives $\Delta p = 7.14$ atm. For example, to warm up heat exchange unit HE, waste cooling water from nuclear reactor is used, and to cool it, river wate before it is taken in to the reactor's cooling system is used.

Volume of the liquid carbon dioxide $CO_2$ in chamber C at evaporation temperature of 25° C will be 0.515 $m^3$ which, in combination with 1 $m^3$ of Mercury Hg = 13560 kg will amount to a total volume of each C = 1.515 $m^3$, while each chamber contains 0.515 $m^3$ = 363 kg of liquid $CO_2$ at all times.

Pressure differential $\Delta p = 7.14$ atm cam lift Mercury Hg to a height of 5.45 m, which would equal its fall distance in meters if the small turbine radius is disregarded. Mercury Hg would fall from a height of 5.45 m at 1.053 sec. reaching velocity of 10.33 m/sec. = 37.2 km per hour.

Should liquid carbon-dioxide $CO_2$ evaporate in the closed chamber in 10 sec., then, 1 $m^3$ of Mercury Hg which flows through pipe P at a speed of 10.33 m/sec., requires a uniform pipe inner diameter ID 11.1 cm, through which flows a mass of 8.13 × $10^7$ grams per minute. The Hg will have been emptied from chamber C more rapidly so, as the $\Delta p$ is higher and Hg surface larger or which this $\Delta p$ is applied.

1 $m^3$ = 13,560 kg of Mercury Hg would fall from a height of 5.45 m in 10 seconds on a turbine hitting it with a power of 7400 kpm/sec − 98.7 HP, or 98.7 HP. Although a larger evaporation and condensation $\Delta t$ would give a larger $\Delta p$ the heat exchange time would increase so, that the engine E power output would remain the same. Consequently, it is more economical to decrease the heat exchange time at smaller evaporation and condensation $\Delta t$ temperature differentials.

Turbine T must, during the evaporation period of 0.515 $m^3$ = 363 kg of liquid $CO_2$, permit 1 $m^3$ of Mercury Hg to pass through and engage the turbine by transferring a maximum of power to the driving shaft, but in no case less than 98% of it, consequently, out of 75.5 kW atleast 71 kW of energy output is achieved.

As a result, industrial unit E, with each chamber capacity of 1.515 $m^3$, filled with a total mount of 1 $m^3$ = 13,560 Hg and 0.515 $m^3$ = 363 kg of liquid $CO_2$ per each chamber C, in which $CO_2$ at a $\Delta t = 5°$ C and a $\Delta p = 7.14$ atm evaporates in 10 seconds and forces Mercury Hg through a pipe ID of 11.1 cm at a speed of 10.33 m/sec and engages turbine T, will develop a power of 72.5 kW. The power thus produced could be increased by further engine improvements or, by simply decreasing the heat exchange time, by unit capacity enlargement and by a combination of several engine E units sorted in a battery arrangement at will.

Electrcity produced by turbine via a generator may not only satisfy the electric energy requirements, but can also operate fuel cells and through it solve the health hazards caused by pollution, exhaust odors and traffic noise.

I claim:

1. A process for producing energy using a pair of zones having a small temperature differential, said process comprising:
    a. hermetically sealing a body of liquid in a pair of air-free vessels at the same height and respectively disposed in said zones, one of said vessels including a fluid readily vaporizable at the temperature of the warmer zone but in a liquid state at the tempe. ture of the cooler zone;
    b. vaporizing said fluid in said one of said vessels and displacing said liquid upwardly by the pressure of the vaporized fluid through a turbine located above the body of liquid to drive the turbine in one direction and transfer said liquid into the other vessel;
    thereafter transferring said warmer zone to said other vessel and the cooler zone to said one vessel to pressurize said liquid with said fluid in said other vessel and displace said liquid through said turbine in the same direction and transfer said liquid into said one of said vessels; and
    performing work with said turbine.

2. The process defined in claim 1 wherein said one of said vessels is heated by environmental heat and said other said vessel is cooled from a natural cooling source.

3. The process defined in claim 1 wherein said one of said vessels is heated with waste heat by a nuclear reactor and said other of said vessels is cooled by dissipation of heat into the environment.

4. The process defined in claim 1 wherein at least one of said vessels is in heat exchanging relationship with water.

5. The process defined in claim 1 wherein said fluid has under normal conditions a boiling point below 80° C.

6. The process defined in claim 5 wherein said liquid is a substance other than said fluid and nonmiscible therewith and does not evaporate at the temperature of the warmer zone.

7. The process defined in claim 5, wherein said fluid is a nonexplosive noninflammable working fluid having a critical temperature close to the ambient temperature and capable of developing large pressure changes with small temperature changes.

8. The process defined in claim 1 wherein said liquid is mercury and said fluid is carbon dioxide.

9. The process defined in claim 1 wherein said fluid is vaporized in said one of said vessels by dipping a heat exchanger constituting said warm zone into a body of said fluid overlying said body of said liquid in said one of said vessels.

10. An apparatus for the production of energy comprising a pair of air-free chambers hermetically sealed against the atmosphere;

a turbine compartment hermetically sealed against the atmosphere;

first duct connecting the bottom of each of said chambers with one side of said compartment whereby liquid flow through said first duct from either chamber will drive a turbine in said compartment in the same sense;

valve means having a single member for alternately connecting said first duct of one chamber to said compartment and the other side of said compartment to the other chamber;

a body of liquid in one of said chambers capable of driving said turbine and disposed therebelow;

a readily volatilizable fluid in said one of said chambers; and means for relatively heating said one of said chambers and relatively cooling the other of said chambers to vaporize and condense said fluid and generate a pressure in said chambers sufficient to drive said body of liquid therefrom through said compartment and into the other chamber.

11. The apparatus defined in claim 10 wherein said fluid is relatively light liquid nonmiscible with the liquid of said body.

12. The apparatus defined in claim 10 wherein a respective heat exchanger is being adapted to dip into liquid within the respective chamber.

13. The apparatus defined in claim 12 wherein said member of said valve means is constructed and arranged for selectively connecting said heat exchangers to a source of warm fluid and a source of cool fluid respectively.

14. The apparatus defined in claim 13 wherein said fluid is carbon dioxide and said liquid is mercury.

* * * * *